United States Patent
Diskin et al.

(10) Patent No.: US 12,450,498 B2
(45) Date of Patent: Oct. 21, 2025

(54) METHOD AND SYSTEM FOR RULE MINING USING QUANTUM COMPUTING

(71) Applicant: Authomize LTD, Tel Aviv (IL)

(72) Inventors: Gal Diskin, Tel Aviv (IL); Avi Aminov, Givat Shmuel (IL)

(73) Assignee: Delinea Inc., San Francisco, CA (US)

( * ) Notice: Subject to any disclaimer, the term of this patent is extended or adjusted under 35 U.S.C. 154(b) by 929 days.

(21) Appl. No.: 17/665,742

(22) Filed: Feb. 7, 2022

(65) Prior Publication Data

US 2022/0261665 A1  Aug. 18, 2022

Related U.S. Application Data

(60) Provisional application No. 63/150,624, filed on Feb. 18, 2021.

(51) Int. Cl.
*G06F 30/327* (2020.01)
*G06N 5/025* (2023.01)
*G06N 10/20* (2022.01)
*G06N 10/60* (2022.01)

(52) U.S. Cl.
CPC .............. *G06N 5/025* (2013.01); *G06N 10/20* (2022.01); *G06N 10/60* (2022.01)

(58) Field of Classification Search
CPC .......... G06N 5/025; G06N 10/20; G06N 10/60
See application file for complete search history.

(56) References Cited

U.S. PATENT DOCUMENTS

| 2019/0121921 A1* | 4/2019 | Nam | G06F 30/327 |
| 2020/0342347 A1* | 10/2020 | Gambetta | G06N 10/70 |
| 2022/0014589 A1* | 1/2022 | Padiyar | H04L 67/12 |

FOREIGN PATENT DOCUMENTS

| CA | 3078585 A1 * | 4/2019 | G06F 16/93 |

* cited by examiner

*Primary Examiner* — Hassan Mrabi
(74) *Attorney, Agent, or Firm* — Rivka Friedman

(57) ABSTRACT

Computerized methods and systems obtain filtered candidate rules associated with components. Each component includes subsets of subjects associated with an organization and subsets of resources associated with the organization. The filtered candidate rules are optimized by a quantum optimization engine to produce optimized rules. Additional rules are produced from the optimized rules by a rule augmenter, and an updated set of rules is formed from the optimized rules and the additional rules. The updated rules are consolidated to produce new rules by taking the union of sets of the updated rules associated with two or more components. The optimizing, augmenting, and consolidating are repeated until only a single set of rules associated with a single component remains.

22 Claims, 4 Drawing Sheets

METHOD AND SYSTEM FOR RULE MINING USING QUANTUM COMPUTING

CROSS-REFERENCE TO RELATED APPLICATIONS

This application claims priority from U.S. Provisional Patent Application No. 63/150,624, filed Feb. 18, 2021, whose disclosure is incorporated by reference in its entirety herein.

TECHNICAL FIELD

The present invention relates to access control.

BACKGROUND OF THE INVENTION

Role-based access control (RBAC) is a well-known approach used for controlling access to computer systems or other electronic resources. In this approach, roles are created for various job functions, and permissions to perform certain actions on certain resources are assigned to specific roles. Members of an organization or enterprise, or other users outside of the organization/enterprise, are assigned particular roles and acquire the permissions needed to access resources through those role assignments. Under this approach, users are normally not directly assigned permissions to access resources, but rather acquire permissions through the roles to which the users are assigned. This approach simplifies common use cases such as enrolling/adding a new user to an organization/enterprise, or handling a change to a user's job function.

RBAC typically uses a standard set of terminology, including the terms "subject", "action", "resource", "environment", and "role". Within the context of RBAC and access control, and as used in the disclosure herein, the term "subject" refers to who or what is requesting to perform an action. Typically, a subject can be a user (e.g., a person that is a member of the organization, such as an employee) or an automated agent (e.g., a computer). Within the context of RBAC and access control, and as used in the disclosure herein, the term "action" refers to the operation the subject would like to perform. Examples of actions include reading or writing to a file stored on a computer system, retrieving data from a database, actuating an electronic access point (e.g., electronic door/gate) to open or close, transferring money via electronic transfer, etc. Within the context of RBAC and access control, and as used in the disclosure herein, the term "resource" refers to the information or object (electronic information or electronic object) that will be impacted by the aforementioned action. This could be, for example, a computer or server system that stores files, a database table, an electronic access point (door or gate) that provides access to a building owned, operated or otherwise associated with the organization/enterprise, etc. Within the context of RBAC and access control, and as used in the disclosure herein, the term "environment" refers to the context in which a request is made. This could be, for example, the time of day of the request, the geographic location or region from which the request originated, the IP address of the computing device from which the request originated, the type of communication channel (e.g., encrypted, non-encrypted) used for transmitting the request, etc. Within the context of RBAC and access control, and as used in the disclosure herein, the term "role" refers to the defined relationship between one or more subjects and one or more resources and possibly one or more actions and/or environments. A role allows the subjects of the role to access each of the resources of the role. If actions and/or environments are also part of the role, the scope of the role is further limited to only the particular sets of actions and/or environments.

Attribute-based access control (ABAC) is another approach for access control that extends RBAC by considering additional attributes when making access control decisions. In particular, ABAC access control policy extends the notion of an RBAC role by also allowing the subjects and resources of the role to be expressed based on the attributes associated with the subjects and resources. For example, ABAC allows one to restrict access only to users (subjects) with specific attributes, for example, only users having a TOP-SECRET clearance attribute. Similarly, access could be restricted only to computers (resources) having a FINANCE department attribute. The effective subjects and effective resources of an ABAC access control policy at a given point in time are the set of subjects and resources defined by the respective subjects' attributes and resources' attributes in the ABAC access control policy at the given time.

In the present document, the term "rules" generally refers to both ABAC access control policies as well as RBAC roles.

Rule mining is the process of creating such roles and/or ABAC access control policies. This process is normally performed using either a top-down or a bottom-up approach. For example, a top-down approach could begin with an inquiry into the access required by a group of users, such as all managers of a department and based on the answer a rule with the needed permissions can be created for such persons. The bottom-up approach looks at any common permissions that already exist within an organization to create such rules.

Normally, a small number of rules is advantageous over a larger number of rules because a smaller number of rules is easier to manage and use. That being said, a small number of rules may be insufficient to express the desired policy and could result in an overly restrictive or overly permissive policy. For these reasons an optimal balance needs to be found which expresses the desired policy using a minimal, or close to minimal set of rules.

Ideally, the process of rule mining should produce a set of rules that allows an organization to enforce a security policy based on the well-known principle of least privilege where a subject is able to perform only the set of actions on the limited set of resources necessary to perform his job and nothing more.

Presently, rule mining is often a substantially manual process which is expensive and error prone. Attempts at automating the process using computer algorithms have been met with only modest success. A large limitation of such algorithms is that they are limited to a single way of analysis whereas organizations usually mix different approaches to construct rules.

In order to solve this, it is possible to treat the problem as an optimization problem between results of multiple approaches to find potential rules. Using classical optimization algorithms such as dynamic programming algorithms, packaging algorithms, set cover algorithms and similar algorithms is an option, however these algorithms do not perform as well as one would like as they either produce suboptimal results or suffer from poor memory or running time complexity which makes their use impractical in large scale environments.

SUMMARY OF THE INVENTION

Aspects of the present invention provide rule mining methods and systems.

Embodiments of the present invention are directed to a computerized method. The method comprises: obtaining a filtered rules list that includes a plurality of filtered lists of candidate rules, each filtered list of candidate rules associated with a respective component that includes a plurality of subsets of subjects associated with an organization and a plurality of subsets of resources associated with the organization, and each filtered list of candidate rules defining an action on at least one of the resources in the plurality of subsets of resources of the component to be taken by at least one of the subjects in the plurality of subsets of subjects of the component; optimizing, by a quantum optimization engine, the filtered rules list to produce an optimized rules list that includes, for each component of the plurality of components, an optimized set of rules associated with the component; augmenting the optimized rules list to produce an additional rules list that includes, for each component of the plurality of components, an additional set of rules associated with the component, and creating an updated rules list that includes, for each component of the plurality of components, an updated set of rules that includes the optimized set of rules associated with the component and the additional rule associated with the component; consolidating the updated rules list to produce a new filtered rules list that includes a plurality of consolidated filtered lists of rules, each consolidated filtered list of rules associated with a consolidated component produced by taking the union of two or more of the components associated with the updated rules list, and each consolidated filtered list of rules produced by taking the union of the updated set of rules associated with the two or components that form the associated consolidated component; and repeating the optimizing, augmenting, and consolidating until only a single set of rules associated with a single component remains.

Optionally, the method further comprises: generating the plurality of components and generating a plurality of candidate rules based on information descriptive of the subjects and information descriptive of the resources stored in one or more directories.

Optionally, the method further comprises: generating the filtered rules list based on the plurality of components and the plurality of candidate rules.

Optionally, generating the plurality of candidate rules includes applying the cartesian product to sets of subjects and sets of resources.

Optionally, the plurality of components is generated such that any pair of components from the plurality of components are non-disjoint.

Optionally, the plurality of components is generated such that: i) no two components in the plurality of components is the same, ii) for each subject in the organization there is at least one component in the plurality of components in which the subject is represented, iii) for each resource in the organization there is at least one component in the plurality of components in which the resource is represented, iv) a subset of subjects in one of the components of the plurality of components is present in at least one other component of the plurality of components, and v) a subset of resources in one of the components of the plurality of components is present in at least one other component of the plurality of components.

Optionally, the method further comprises: outputting the single set of rules as a set of rules that can be used by the organization to control access to the resources associated with the organization.

Optionally, the resources are electronic resources and each of the resources is of a resource type selected from the group consisting of: a computer, a server, a database, and an electronic access point.

Optionally, each of the subjects is of a subject type selected from the group consisting of: a user, a computer, and a server.

Optionally, the quantum optimization engine is configured as at least one of: i) a quantum optimizer that includes quantum computing circuitry for performing quantum optimization algorithms, or ii) a quantum inspired optimizer that includes non-quantum computing circuitry for performing quantum inspired optimization algorithms.

Optionally, the filtered lists of candidate rules are produced from a plurality of candidate rules, and the candidate rules are in accordance with a role-based access control (RBAC) policy.

Optionally, the filtered lists of candidate rules are produced from a plurality of candidate rules, and the candidate rules are in accordance with an attribute-based access control (ABAC) policy.

Embodiments of the present invention are directed to a computer system. The computer system comprises: a non-transitory computer readable storage medium for storing computer components; and a computerized processor for executing the computer components. The computer components comprise: a rule mining manager that is configured to: obtain a filtered rules list that includes a plurality of filtered lists of candidate rules, each filtered list of candidate rules associated with a respective component that includes a plurality of subsets of subjects associated with an organization and a plurality of subsets of resources associated with the organization, and each filtered list of candidate rules defining an action on at least one of the resources in the plurality of subsets of resources of the component to be taken by at least one of the subjects in the plurality of subsets of subjects of the component, instruct a quantum optimization engine to perform an optimization step by providing the filtered rules list to the optimization engine to produce an optimized rules list that includes, for each component of the plurality of components, an optimized set of rules associated with the component, instruct a rule augmenter to perform an augmentation step to produce, based in part on the optimized rules list, an additional rules list that includes, for each component of the plurality of components, an additional set of rules associated with the component, perform an update step by creating an updated rules list that includes, for each component of the plurality of components, an updated set of rules that includes the optimized set of rules associated with the component and the additional rule associated with the component, perform a consolidation step by consolidating the updated rules list to produce a new filtered rules list that includes a plurality of consolidated filtered lists of rules, each consolidated filtered list of rules associated with a consolidated component produced by taking the union of two or more of the components associated with the updated rules list, and each consolidated filtered list of rules produced by taking the union of the updated set of rules associated with the two or components that form the associated consolidated component, and repeatedly: instruct the quantum optimization engine to perform the optimization step, the rule augmenter to perform the augmentation step, perform the update step, and perform the consolidation step until only a single set of rules associated with a single component remains.

Optionally, the computer components further comprise: a rule generator configured to generate a plurality of candidate rules based on information descriptive of the subjects and information descriptive of the resources received from one or more directories communicatively coupled to the rule mining manager, and a component generator configured to generate the plurality of components based on information descriptive of the subjects and information descriptive of the resources received from one or more directories communicatively coupled to the rule mining manager.

Optionally, the computer components further comprise: a rule filter configured to receive the plurality of components and the plurality of candidate rules, and responsively produce the filtered list of candidate rules for each component.

Optionally, the rule generator is configured to generate the plurality of candidate rules by applying the cartesian product to sets of the subjects and sets of the resources.

Optionally, the component generator is configured to generate the plurality of components such that: i) no two components in the plurality of components is the same, ii) for each subject in the organization there is at least one component in the plurality of components in which the subject is represented, iii) for each resource in the organization there is at least one component in the plurality of components in which the resource is represented, iv) a subset of subjects in one of the components of the plurality of components is present in at least one other component of the plurality of components, and v) a subset of resources in one of the components of the plurality of components is present in at least one other component of the plurality of components.

Optionally, the quantum optimization engine is configured as at least one of: i) a quantum optimizer that includes quantum computing circuitry for performing quantum optimization algorithms, or ii) a quantum inspired optimizer that includes non-quantum computing circuitry for performing quantum inspired optimization algorithms.

Optionally, the computer components further comprise: a rule generator configured to generate a plurality of candidate rules in accordance with a role-based access control (RBAC) policy.

Optionally, the computer components further comprise: a rule generator configured to generate a plurality of candidate rules in accordance with an attribute-based access control (ABAC) policy.

Optionally, the rule mining manager is further configured to output the single set of rules as a set of rules that can be used by the organization to control access to the resources associated with the organization.

Embodiments of the present invention are directed to a computer usable non-transitory storage medium having a computer program embodied thereon for causing a suitable programmed system to perform the following steps when such program is executed on the system. The steps comprise: obtaining a filtered rules list that includes a plurality of filtered lists of candidate rules, each filtered list of candidate rules associated with a respective component that includes a plurality of subsets of subjects associated with an organization and a plurality of subsets of resources associated with the organization, and each filtered list of candidate rules defining an action on at least one of the resources in the plurality of subsets of resources of the component to be taken by at least one of the subjects in the plurality of subsets of subjects of the component; optimizing, by a quantum optimization engine, the filtered rules list to produce an optimized rules list that includes, for each component of the plurality of components, an optimized set of rules associated with the component; augmenting the optimized rules list to produce an additional rules list that includes, for each component of the plurality of components, an additional set of rules associated with the component, and creating an updated rules list that includes, for each component of the plurality of components, an updated set of rules that includes the optimized set of rules associated with the component and the additional rule associated with the component; consolidating the updated rules list to produce a new filtered rules list that includes a plurality of consolidated filtered lists of rules, each consolidated filtered list of rules associated with a consolidated component produced by taking the union of two or more of the components associated with the updated rules list, and each consolidated filtered list of rules produced by taking the union of the updated set of rules associated with the two or components that form the associated consolidated component; and repeating the optimizing, augmenting, and consolidating until only a single set of rules associated with a single component remains.

Throughout this document, reference is made to various lists and sets, for example various types of rules lists and various sets of rules. These lists and sets are data objects that contain data and information which can be read from and written to computerized memory/storage, and manipulated by performing various operations on such data objects by computerized processors or similar such devices or apparatus.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
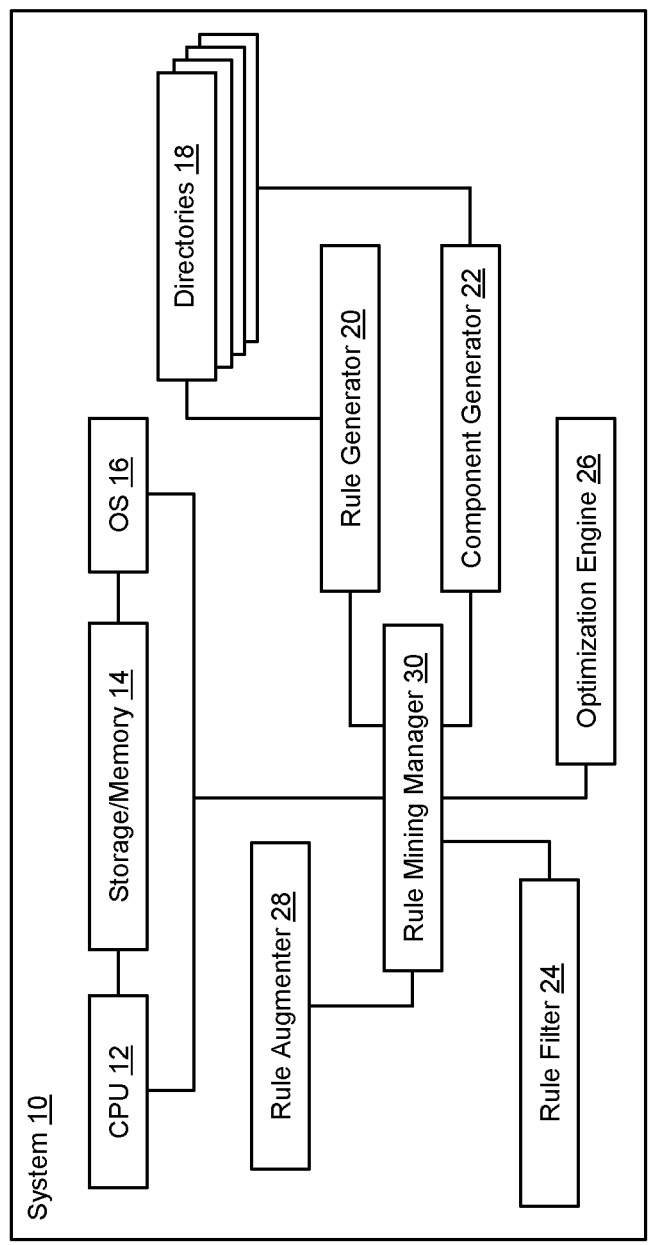
FIG. 1 is a diagram of the architecture of an exemplary system embodying the present disclosure.

Embodiments of the present invention provide rule mining methods and systems. The rule mining methods and systems are performed on data/information about subjects and (electronic) resources of an organization/enterprise. These electronic resources can be of various resource types including, for example, computers and computer systems, servers and server systems (such as mail servers, database servers, web servers, etc., database tables, electronic access points, and the like. The subjects can be of various subject types, including, for example, users or people (i.e., employees or members of the organization/enterprise) which can be organized into various departments of the organization (e.g., human resources, engineering, finance, maintenance, quality assurance, legal, etc.), as well as computers and/or servers. As will be described, the rule mining methods according to the disclosed embodiments operate on input rule and data sets that are typically too large to be handled by conventional (i.e., classical) optimization algorithms to produce any reasonable or practical result. Thus, the rule mining methods according to the disclosed embodiments employ quantum or quantum inspired optimization algorithms and techniques, which enable practical production of rules and policies that can be used by the organization/enterprise for controlling access to the electronic resources by the subjects.

The principles and operation of the methods and systems according to the present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Referring now to the drawings, FIG. 1 illustrates an exemplary rule mining system (referred to hereinafter as "system") 10 according to embodiments of the present disclosure as an architecture. The system 10 provides logic and logic functions, and is generally configured to receive input including information from one or more directories 12, and to perform rule mining using the logic and logic functions based upon the received input.

The system 10 includes a central processing unit (CPU) 12 formed from one or more processors. The processors can, for example, be conventional processors, such as those used in servers, computers, and other computerized devices. For example, the processors may include x86 Processors from AMD and Intel, Xeon® and Pentium® processors from Intel, as well as any combinations thereof. However, as will be discussed in subsequent sections of the present disclosure, the processors may include or be linked to special purpose processors in order to perform logic and logic functions associated with the optimization techniques of the embodiments disclosed herein.

The CPU 12 is electronically coupled (connected) to a storage/memory 14 for storing machine executable instructions, executable by the CPU 12, for performing the processes of the system 10, as will be detailed in subsequent sections of the present disclosure. The storage/memory 14, although shown as a single component for representative purposes, may be multiple components. The CPU 12 is also electronically coupled (connected), either directly or indirectly, to various modules (computer components) that are configured to perform the various logic functions of the present disclosure. The CPU 12 is further electronically coupled (connected) to an operating system (OS) 16 that may load machine executable instructions, stored in the storage/memory 14, for execution by the CPU 12. The OS 16 may include any of the conventional computer operating systems, such as those available from Microsoft of Redmond Washington, commercially available as Windows® OS, such as Windows® 10, Windows® 7, MAC OS from Apple of Cupertino, CA, or Linux, or may include real-time operating systems, or may include any other type of operating system typically deployed in sandboxed systems as known in the art.

Various modules (computer components) are part of, or communicatively coupled to, the system 10, and are configured to perform the various logic functions of the disclosed embodiments. The system 10 includes software, software routines, computer program code, computer program code segments and the like, embodied, for example, in computer components, modules and the like. These computer components, modules and the like generally include a rule generator 20, a component generator 22, a rule filter 24, a quantum optimization engine 26, a rule augmenter 28, and a rule mining manager 30.

With continued reference to FIG. 1, the system 10 uses one or more directories 18 which can store data/information about the subjects and resources on which rule mining is to be performed. In the illustrated embodiment, the directories 18 are part of the system 10, however in other embodiments the directories 18 are external to the system 10 and are communicatively coupled to components of the system 10 through an application programming interface (API) or a network protocol.

Figure 2:
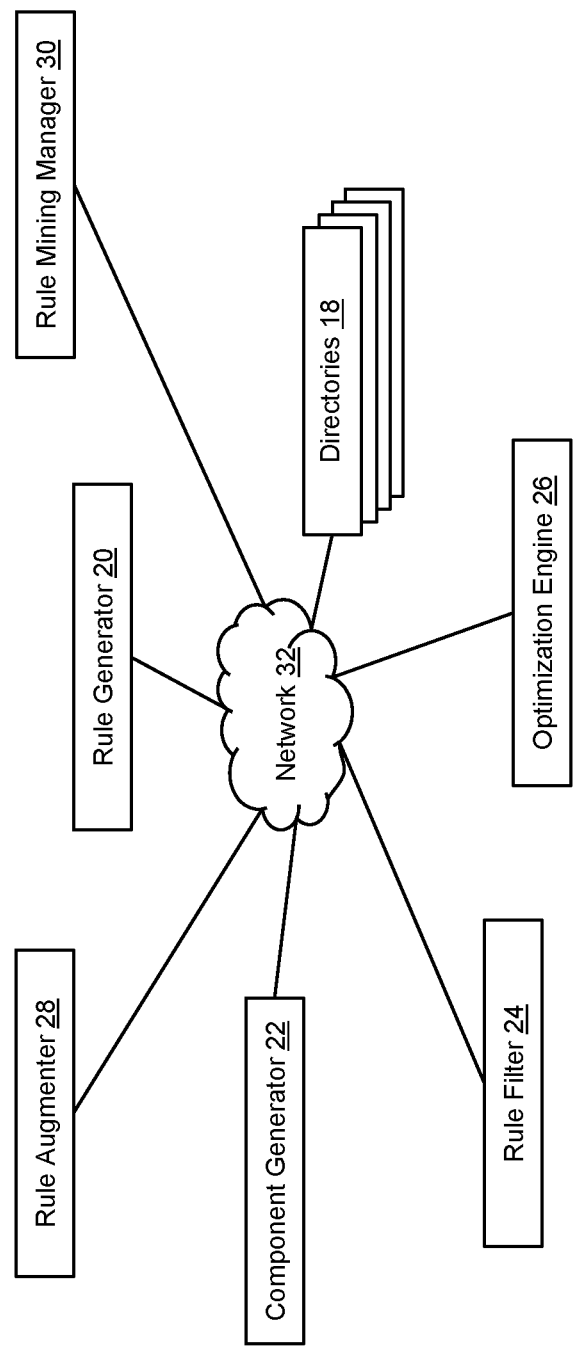
FIG. 2 is a diagram illustrating an example environment in which a system according to an embodiment of the present disclosure can be deployed.

FIG. 2 illustrates an example environment in which a system according to an embodiment of the present disclosure can be deployed, in which the directories 18 are communicatively coupled to one or more components of the system 10 via network 32, which may be formed of one or more communication networks, including for example, the Internet, cellular networks, wide area, public, and local networks. In one non-limiting example, one or more of the external directories 18 is an LDAP directory, i.e., a directory that operates according to lightweight directory access protocol (LDAP), such as Active Directory developed by Microsoft. In another example, when a set of resources is managed by an organization in a public cloud environment such as in Amazon Web Services (AWS) —available from Amazon of Seattle Washington—or Microsoft Azure, the information stored in the directory 18 is normally accessed through an API using a network protocol. Another example of such a directory 18 could be a database. It should be appreciated that the information about the subjects and resources stored in these directories 18 could include various attributes related to the subjects and resources which could represent the relationship between these resources. For example, an Active Directory could store information related to the employees of an organization including employee job title, organization affiliation, identity of employee's manager, and so on. A public cloud-based directory could store information on virtual machine instances used by an organization. Such virtual machine instances could be regarded as resources but could also be regarded as subjects in case the virtual machine instances need to access or operate on other resources. For each such virtual machine instance the directory could store additional information that could be used in rule mining such as the type of software installed on these instances as well as the virtual machine instance location within the virtual network. In many cases, the directories 18 could store information about the groups to which the subjects and resources may belong. The directories 18 could also store information related to activities carried out by the subjects on the resources. The information could be, for example, stored in the form of logs.

According to an embodiment of the present disclosure, the system 10 uses one or more existing policies for which rule mining is to be performed. The existing policy could be expressed in various forms including through the use of RBAC roles, ABAC access control policy or alternatively through the use of one or more rule bases. The existing policy could be stored in the one or more directories 18.

The following paragraphs describe the various modules (computer components) that are part of, or communicatively coupled to, the system 10, including the rule generator 20, the component generator 22, the rule filter 24, the quantum optimization engine 26, the rule augmenter 28, and the rule mining manager 30.

The rule generator 20 takes as input from the one or more directories 18 information descriptive of subjects and resources that are part of or otherwise associated with the enterprise/organization, typically in the form of a list of subjects and a list of resources, that is stored in the directories 18. The rule generator 20 may also receive as input additional information related to these resources, that is stored in these directories 18, such as a list of potential actions associated with the resources as well as a set of potential environments. In response to receiving the information (e.g., list of subjects and list of resources, and possibly additional information related to the resources), the rule generator 20 produces a list having a plurality of candidate rules.

In one embodiment, the rule generator 20 generates candidate rules in accordance with RBAC policy (i.e., restricting system access to authorized users) whereby the rule generator 20 generates a list of candidate roles by outputting the set which is the cartesian product of the set of all the non-empty subsets of the subjects with the set of all the non-empty subsets of the resources. For example, if the set of subjects is {Adam, Eve} and the set of resources is {Apple, Leaf} then the list of candidate roles would be the cartesian product of {{Adam, Eve}, {Adam}, {Eve}} and {{Apple, Leaf}, {Apple}, {Leaf}}.

Alternatively, the rule generator 20 may generate a list of candidate ABAC policies by outputting the set which is the cartesian product of the set of all the non-empty subsets of the subject attributes with the set of all the non-empty subsets of the resource attributes. For example, if the set of subject attributes is {MALE, FEMALE} and the set of resources attributes is {FRUIT, ANIMAL} then the list of candidate ABAC policies would be the cartesian product of {{MALE, FEMALE} {MALE}. {FEMALE}} and {{FRUIT, ANIMAL}, {FRUIT}, {ANIMAL}}.

The rule generator 20 could optionally augment the cartesian products of candidate rules by adding to the cartesian products the set of all subsets of potential actions associated with said resources as well as a set of potential environments. In order to better explain this augmentation, the present disclosure will use following notation: S=set of all non-empty subsets of subjects; R=set of all non-empty subsets of resources; A=set of all non-empty subsets of actions; E=set of all non-empty subsets of environments; SA=set of all non-empty subsets of subjects' attributes; RA=set of all non-empty subsets of resource' attributes. Thus, the rule generator 20 could output a list of candidate rules consisting of any of the following cartesian products: S×R; S×R×A; S×R×E; S×R×A×E; SA×RA; SA×RA×A; SA×RA×E; SA×RA×A×E.

Alternatively, the rule generator 20 could use additional information available in the one or more directories 18 to reduce the number of candidate rules. For example, the rule generator 20 could limit the set of subjects or resources used in each rule to only a set whose members all share one or more attributes. For example, the set of subjects used in each candidate rule could be limited to only sets whose members share the same job description. In doing this, the rule generator 20 could utilize well-known community detection algorithms such as minimum-cut, hierarchical clustering, clique-based methods and the Girvan-Newman algorithm.

In certain embodiments, the rule generator 20 can consult the existing policy to only output candidate rules which comply with the existing policy. In other embodiments, instead of outputting a complete list of candidate rules, the rule generator 20 could instead provide an efficient on-demand way of iterating through the list.

As will be explained in further detail below, in order to efficiently perform rule mining in a large organization (e.g., an organization with a large number of subjects and/or a large number of resources) it is advantageous to break down the rule mining problem into smaller problems, whereby rule mining is performed on smaller parts of the organization. Each such smaller part of the organization is referred to hereinafter as a component of the organization, or simply "component". Each component is formed from two elements, namely, a first element that is a plurality of subsets of subjects in the organization, and a second element that is a plurality of subsets of the resources in the organization. For example, the first element of one possible component could be formed from the subset of subjects in an organization that is all employees in the Human Resources (HR) department, and the subset of subjects in the organization that is all employees in the Finance department. By further example, the second element of the one possible component could be formed from the subset of resources in the organization that is all database servers in London, and the subset of resources in the organization that is all mail servers in New York.

According to certain embodiments of the present disclosure, the component generator 22 takes as input from the one or more directories 18 the list of subjects and resources (and possibly additional information related to these resources stored in these directories 18 such as a list of potential actions associated with the resources as well as a set of potential environments) and produces/generates a list having a plurality of components.

The component generator 22 is configured to generate the list of components such that any pair of two components in the list are non-disjoint. This property of being non-disjoint is satisfied when the following five criteria are simultaneously satisfied: 1) No two components in the list of components are the same; 2) For each subject in the organization, there is at least one component in the list of components in which the subject is represented; 3) For each resource in the organization, there is at least one component in the list of components in which the resource is represented; 4) A subset of subjects in one component in the list of components is present in at least one other component in the list of components; and 5) A subset of resources in one component in the list of components is present in at least one other component in the list of components.

For example, consider an organization having employees that are organized into three departments—HR, Finance, and Engineering—and having resources that are organized into three groups—Group 1 (e.g., database servers), Group 2 (e.g., mail servers), and Group 3 (e.g., web servers). The following would be a valid list of components that could be produced by the component generator 22:

1) [HR, Finance]×[Group 1, Group 2]
2) [Finance, Engineering]×[Group 1, Group 3]
3) [HR, Engineering]×[Group 2, Group 3].

The first component in the list has as its first element the subset of subjects in the HR department and the subset of subjects in the Finance department, and has as its second element the subset of resources in Group 1 and the subset of resources in Group 2. The second component in the list has as its first element the subset of subjects in the Finance department and the subset of subjects in the Engineering department, and has as its second element the subset of resources in Group 1 and the subset of resources in Group 3. The third component in the list has as its first element the subset of subjects in the HR department and the subset of subjects in the Engineering department, and has as its second element the subset of resources in Group 2 and the subset of resources in Group 3. Thus, as can be seen, the list simultaneously satisfies all five of the above-mentioned criteria, and is therefore a valid list of components.

The rule filter 24 is configured to (i.e., functions to, is operative to) take as input a list of candidate rules (alternatively referred to as a "candidate rule set" or "set of candidate rules") and a component. For example, the rule filter 24 can be configured to receive a list of candidate rules from the rule generator 20 and to receive a component from the component generator 22. For a received component and a received list of candidate rules, the rule filter 24 iterates over the candidate rules in the list of candidate rules and filters out all candidate rules that are not contained within the component. A rule is defined to be contained within a component only if each one of the subjects or effective subjects in the rule is present in at least one of the plurality of subsets of subjects in the component and each one of the resources or effective resources in the rule is present in at least one of the plurality of subsets of resources in the component. In certain embodiments, the rule filter 24 is further configured to filter out rules based on additional criteria. For example, the rule filter 24 may, for each candidate rule, compute the ratio between the size of the set of resources or effective resources and the size of the set of subjects or effective subjects defined by the rule, and then compare the computed ratio to a pre-configured threshold value. The rule filter 24 can then filter out the candidate rule if the computed ratio crosses the pre-configured threshold The rule filter 24 produces as output a filtered list of candidate rules associated with the input component, which consists of all candidate rules (that are associated with the input component) that are not filtered out. This filtered list of candidate rules is referred to alternatively as a "filtered candidate rule set" or "set of filtered candidate rules".

Filtered lists of candidate rules are provided as input to the quantum optimization engine 26 which generates for each such filtered list of candidate rules an optimized set of rules (referred to alternatively as an "optimized rule set" or "list of optimized rules"). As mentioned in the background section of this document, classical optimization algorithms such as dynamic programming algorithms, packaging algorithms, set cover algorithms and similar algorithms, when provided with large input rule and data sets either produce suboptimal results or suffer from poor memory or running time complexity which makes their use impractical for such rule and data sets. For organizations having several tens, hundred, or even thousands of subjects (e.g., employees and computers) and several tens, hundreds, or even thousands of electronic resources (computers, servers, database tables, electronic access points, etc.), the number of candidate rules to be optimized by the optimization engine 26—even after undergoing filtering by the rule filter 24—can be too large to produce any usable results when applying classical optimization algorithms. Therefore, according to the embodiments disclosed herein the quantum optimization engine 26 is configured to execute Quantum Optimization (QO) algorithms or Quantum Inspired Optimization (QIO) algorithms—which together are referred to as "quantum-type optimization (QTO) algorithms". QTO algorithms have been found to produce superior results as compared to classical optimization algorithms, and without suffering from drawbacks such as poor memory or running time complexity, even when operating on large input rule sets.

By way of introduction, QO algorithms constitute a class of algorithms that utilize Quantum Computing (QC) hardware to solve optimization problems. Examples of QO algorithms include adiabatic quantum optimization and quantum annealing. QC hardware, including hardware for performing QO is available from companies such as D-Wave Systems Inc. of Burnaby Canada, and Rigetti Computing of Berkeley California, and others. Access to QC hardware is also available as a service through vendors such as Amazon Web Services, Microsoft Azure, and Google.

Quantum Inspired Optimization (QIO) algorithms are a set of optimization algorithms that mimic QO on classical hardware, and in many cases outperform classical optimization algorithms. Various platforms for using QIO algorithms are currently provided as services through vendors such as Microsoft Azure as well as Fujitsu of Tokyo Japan.

The present disclosure and claims use the term "optimization" and its variants including "optimizer" and "optimized". The term "optimization", as used herein, is not necessarily limiting to processes that find an optimal or best result for a given problem, but can more generally include processes that find suitable results for a given problem, which may in certain cases be sub-optimal but nonetheless usable solutions. To this end, within the context of the present disclosure and claims, outputs generated or produced by a module or component that functions to perform an optimization algorithm on a given input are considered to be optimized outputs, regardless of whether the generated outputs are in fact optimal or best results.

Bearing this in mind, the quantum optimization engine 26 is configured to execute QTO algorithms on received input lists of candidate rules in order to produce optimized sets of rules.

In certain embodiments, the quantum optimization engine 26 is a quantum optimizer that executes QO algorithms. The quantum optimizer takes as input a component as well as a filtered list of candidate rules associated with the component, and performs the aforementioned QO algorithm to produce an optimized set of rules associated with said component. The target of optimization could be, for example, to select from the filtered list of candidate rules a proper subset of rules which provides the same level of access as the filtered list of candidate rules. While ideally, the optimized set of rules being output should constitute a minimal set, in some cases, a tradeoff could be made between reaching the optimal result and producing a result in a shorter amount of time.

In other embodiments, the quantum optimization engine 26 is a quantum inspired optimizer that executes QIO algorithms. The quantum inspired optimizer takes as input a component as well as a filtered list of candidate rules associated with said component, and performs the aforementioned QIO algorithm to produce an optimized set of rules associated with said component. The target of optimization could be, for example, to select from the filtered list of candidate rules a proper subset of rules which provides the same level of access as the filtered list of candidate rules. While ideally, the optimized set of rules being output should constitute a minimal set, in some cases, a tradeoff could be made between reaching the optimal result and producing a result in a shorter amount of time.

It should be noted that in certain embodiments, the quantum optimization engine 26 includes both a quantum optimizer and a quantum inspired optimizer or alternatively only one of the two. Regardless of whether a quantum optimizer, a quantum inspired optimizer or both are used, the quantum optimization engine 26 may first transform the optimization problem to a quadratic unconstrained binary optimization (QUBO) problem before solving the problem as a QUBO problem.

In certain embodiments, such as the embodiment illustrated in FIG. 1, the quantum optimization engine 26 is part of the system 10. In such embodiments, and when the quantum optimization engine 26 includes a quantum optimizer that is configured to execute QO algorithms, the quantum optimizer comprises quantum computing circuitry and instructions for performing QC. Specifically, the quantum optimizer should be able to perform one or more of the QO algorithms described above. As such, the CPU 12 preferably includes or is linked to special purpose processors and special purpose QC hardware to enable execution of such algorithms by the quantum optimization engine 26. When the quantum optimization engine 26 is part of the system 10 and includes a quantum inspired optimizer configured to execute QIO algorithms, the quantum inspired optimizer comprises classical computer circuitry (i.e., non-quantum computing circuitry) and instructions for performing QIO algorithms. Specifically, the quantum inspired optimizer should be able to perform one or more of the QIO algorithms described above. As such, the CPU 12 may include or be linked to one or more special purpose processors and classical hardware in order to enable execution of such QIO algorithms by the quantum optimization engine 26.

In other embodiments, the quantum optimization engine 26 is external to the system 10 and is communicatively coupled to components of the system 10 through an application programming interface (API) or a network protocol. FIG. 2 illustrates an embodiment in which the quantum optimization engine 26 is communicatively coupled to one or more components of the system 10 via the network 32. In such an embodiment, for example, the quantum optimization engine 26 may receive a filtered list of candidate rules from the rule filter 24 via the network 32.

The rule augmenter 28 is configured to receive as input a rule, a set of resources, and an existing policy, and produce as output an additional rule. The additional rule consists of the set of subjects of the input rule, and a set of resources that consists of all of the resources in the input set of resources that all of the subjects in the input rule are allowed to access according to the input existing policy. In certain embodiments, the rule augmenter 28 is configured to generate an additional rule that consists of the attributes of the set of subjects of the input rule, and a set of resource attributes such that all of the subjects in the input rule are allowed to access the respective effective resources at the time in which the rule augmenter 28 executes according to the input existing policy. In certain embodiments, each of the additional rules that are output by the rule augmenter 28 may also include one or more actions and/or environments, as long as the resulting additional rule complies with the input existing policy.

The rule mining manager 30 functions to receive as input a list of candidate rules (i.e., a candidate rule set having a plurality of candidate rules) from the rule generator 20, and a list of components (i.e., a plurality of components) from the component generator 22. The rule mining manager 30 iterates over the components in the received list of components to obtain a filtered rules list, where each entry in the filtered rules list includes a filtered list of candidate rules (i.e., a candidate rule set) associated with a respective one of the components. Specifically, for each component in the list of components, the rule mining manager 30 provides the component and the associated list of candidate rules to the rule filter 24. The rule filter 24, in response to receiving the component and associated list of candidate rules as input, produces a filtered list of candidate rules associated with the component, and provides the filtered list of candidate rules to the rule mining manager 30. By providing multiple components and correspondingly associated lists of candidate rules to the rule filter 24 as input, the rule mining manager 30 is able to obtain from the rule filter 24 a filtered rules list where each element in the filtered rules list is associated with a respective one of the components and consists of a filtered list of candidate rules associated with the respective one of the components. In certain embodiments, the filtered rules list can be used to form, or can itself be, a composite component-filtered-rule list having a plurality of elements, where each element includes a component and the filtered list of candidate rules associated with the component.

The rule mining manager 30 further functions to provide the filtered rules list as input to the quantum optimization engine 26. Specifically, for each component the rule mining manager 30 provides the component and the filtered list of candidate rules associated with the component as input to the quantum optimization engine 26, and receives from the quantum optimization engine 26 an optimized set of rules associated with the component. By providing multiple components and correspondingly associated filtered lists of candidate rules to the quantum optimization engine 26 as input, the rule mining manager 30 is able to obtain an optimized rules list (having at least one optimized rule for each component) from the quantum optimization engine 26, which is a list of elements where each element in the list is associated with a respective one of the components and consists of an optimized set of rules associated with the respective one of the components. In certain embodiments, the optimized rules list can be used to form, or can itself be, a composite component-optimized-rule list having a plurality of elements, where each element includes a component and the optimized set of rules associated with the component.

The rule mining manager 30 further functions to provide the optimized rules list as input to the rule augmenter 28, together with sets of resources and an existing policy. Specifically, for each component the rule mining manager 30 provides to the rule augmenter 28 the optimized set of rules associated with that component, the set of resources associated with that component, and the existing policy, and responsively receives as output from the rule augmenter 28 an additional set of rules associated with the component. As a result, the rule mining manager 30 is able to obtain an additional rules list (having at least one additional rule for each component) from the rule augmenter 28, which is a list of elements where each element in the list is associated with a respective one of the components and consists of an additional set of rules associated with the respective one of the components. The additional set of rules for (i.e., associated with) a given component consists of an additional rule for each corresponding input optimized rule. As discussed above, each such additional rule consists of the set of subjects of the input rule (in this case the input optimized rule), and a set of resources that consists of all of the resources in the input set of resources that all of the subjects in the input rule are allowed to access according to the input existing policy. In certain embodiments, the additional rules list can be used to form, or can itself be, a composite component-additional-rule list having a plurality of elements, where each element includes a component and the additional set of rules associated with the component.

The rule mining manager 30 further functions to create an updated rules list from the optimized rules list and the additional rules list. In particular, for each component, the rule mining manager 30 creates an updated set of rules associated with that component which consists of the union of the optimized set of rules (produced by the quantum optimization engine 26) and the additional set of rules (produced by the rule augmenter 28). As a result, the rule mining manager 30 is able to obtain an updated rules list, which is a list of elements in which each element in the list consists of an updated set of rules associated with a respective one of the components. In certain embodiments, the updated rules list can be used to form, or can itself be, a composite component-updated-rule list having a plurality of elements, where each element includes a component and the updated set of rules associated with the component.

The rule mining manager 30 further functions to perform a consolidation step (also referred to as a combining or merging step) in which the rule mining manager 30 consolidates elements of the updated rules list to form a new filtered rules list. In particular, the rule mining manager 30 creates a new filtered rules list which is a list of elements. Each element in the list is associated with a respective consolidated component and consists of a consolidated filtered list of optimized candidate rules associated with the respective consolidated component. Each consolidated component is formed by taking the union of the two or more (non-disjoint) components associated with the updated rules list. Each consolidated filtered list of optimized candidate rules is formed by taking the union of the two or more updated set of rules that are respectively associated with the two or more (non-disjoint) components used to form the associated consolidated component. In this way, the rule mining manager 30 is able to incrementally pare down the updated rules list.

Preferably the set of components used to form one consolidated component is disjoint from the sets of components used to form all of the other consolidated components. In other words, if one consolidated component is formed by taking the union of two particular subsets, preferably no other consolidated component can be formed using either of those same two particular subsets. For example, if the components of the updated rules list include four components $\alpha$, $\beta$, $\gamma$, $\delta$, and if one consolidated component is formed as $\alpha \cup \beta$, then preferably the only other option for the remaining consolidated component is $\gamma \cup \delta$. By way of further example, if the components of the updated rules list include five components $\alpha$, $\beta$, $\gamma$, $\delta$, $\varepsilon$, and if one consolidated component is formed as $\alpha \cup \beta$, then preferably the only other option for the remaining consolidated component is $\gamma \cup \delta \cup \varepsilon$.

In situations in which the number of components associated with the updated rules list is even, the rule mining manager 30 preferably selects, for each consolidated component, two unique components to form each of the consolidated components from a unique pair of components. In situations in which the number of components associated with the updated rules list is odd, the rule mining manager 30 preferably selects, for all but one of the consolidated components, two unique components to form each of those consolidated components from a unique pair of components. For the one consolidated component not formed from a pair of components, the rule mining manager 30 preferably uses the three remaining components to form that consolidated component.

The rule mining manager 30 further functions to provide the new filtered rules list as input to the quantum optimization engine 26 in order to responsively receive from the quantum optimization engine 26 new optimized rules list (which is a list of elements where each element in the list is associated with a respective one of the consolidated components and consists of an optimized set of rules associated with the respective one of the consolidated components). The rule mining manager 30 also functions to provide the new optimized rules list as input to the rule augmenter 28 (together with the corresponding resources and existing policy) in order to responsively receive from the rule augmenter 28 a new additional rules list. The rule mining manager 30 repeats this process until only a single component having associated therewith a single list of candidate rules remains, and then outputs the list of candidate rules as output.

Figure 3:
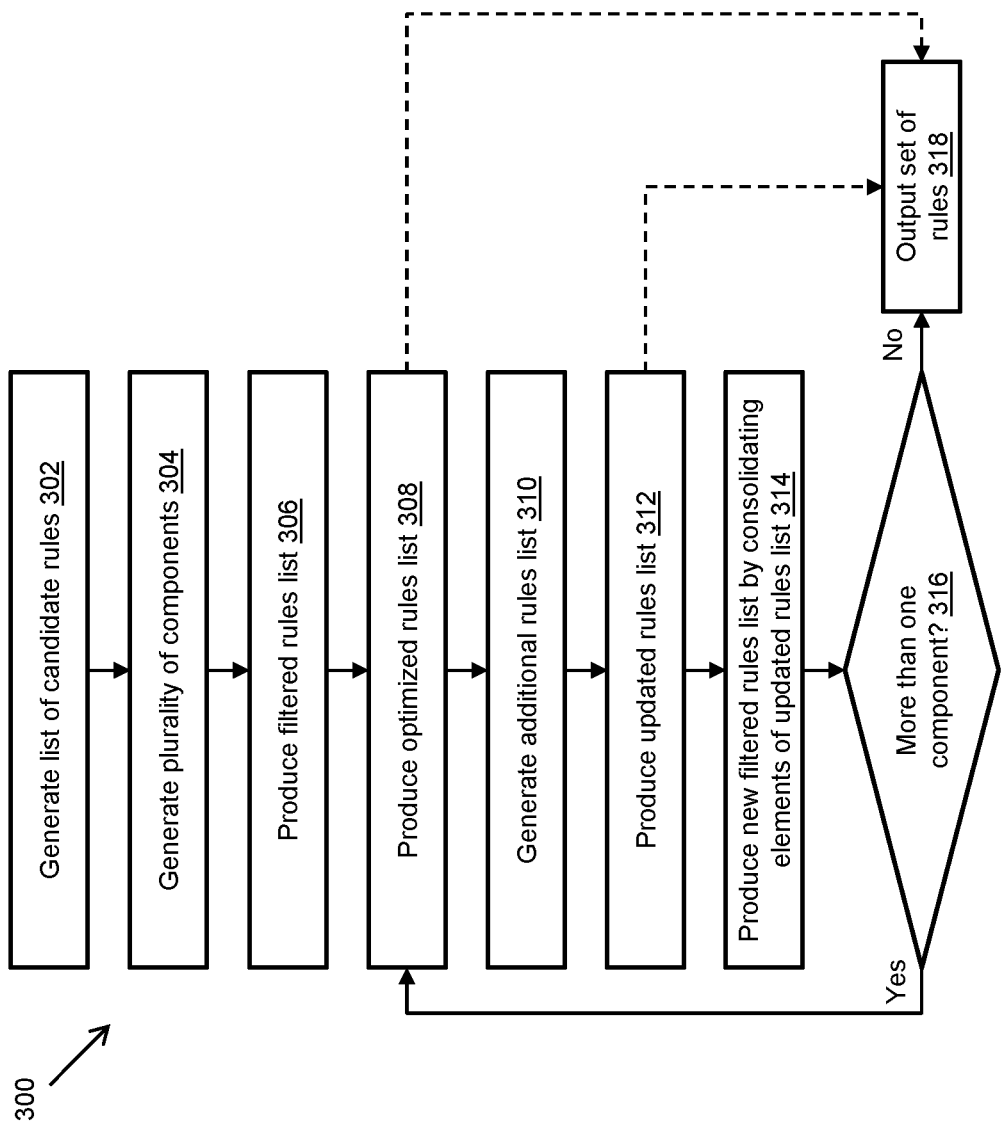
FIG. 3 is a flow diagram illustrating a process for rule mining that outputs an optimized set of rules that can be used by an organization or enterprise to control access to organizational resources, according to an embodiment of the present disclosure.

Attention is now directed to FIG. 3 which shows a flow diagram illustrating a computer-implemented (i.e., a computerized) process 300 in accordance with embodiments of the disclosed subject matter. This computer-implemented process is an iterative process, and includes a rule mining algorithm that outputs an optimized set of rules that can be used by an organization or enterprise to control access to organizational resources. Reference is also made to FIGS. 1 and 2 and the components illustrated therein. The process and sub-processes of FIG. 3 are computerized processes performed by the system 10, including, for example, the CPU 12 and associated components, such as the rule mining manager 30, the rule generator 20, the component generator 22, the rule filter 24, the quantum optimization engine 26, and the rule augmenter 28. The aforementioned processes and sub-processes are for example, performed automatically by the system 10, and are performed, for example, in real-time.

The process 300 begins at block 302, where the rule generator 20 generates a list of candidate rules. As discussed above in detail, the rule generator 20 takes as input from one or more directories 18 information descriptive of subjects and resources, preferably a list of subjects and resources (and possibly additional information related to these resources stored in these directories 18 such as a list of potential actions associated with the resources as well as a set of potential environments), and produces the list of candidate rules.

At block 304, the component generator 22 generates a plurality of components (i.e., a list of components). As discussed above in detail, the component generator 22 takes as input from the one or more directories 18 the list of subjects and resources (and possibly additional information related to these resources stored in these directories 18 such as a list of potential actions associated with the resources as well as a set of potential environments) and produces/generates the list of components. The component generator 22 generates the list of components such that any pair of two components in the list of components are non-disjoint.

Parenthetically, the number of components that are generated at block 304 may provide a basis for the number of iterations that will be executed by the process 300, since at each iteration of the process 300 the rule mining manager 30 performs a consolidation step (block 314) that consolidates groups of two or more components into consolidated components. To this end, if the number of generated components, N, is a power of two (i.e., if N components are generated at block 304 and $N=2^m$, where m is an integer), then the number of iterations is $\log_2 N$ if the rule mining manager 30 performs consolidation using groups of two components. For example, if N=8, then the rule mining manager 30 may consolidate the eight components into four consolidated components in the first iteration, consolidate the four consolidated components into two consolidated components in the second iteration, and consolidate the two consolidated components into a singular consolidated component in the third iteration. In cases where $N \neq 2^m$, if the rule mining manager 30 performs consolidation using groups of two components to generate all consolidated components (except for the last consolidated component which is formed from three components), the number of iterations is $\lfloor \log_2 N \rfloor$. Thus, in general when employing consolidation using groups of two components whenever possible, the number of iterations is expected to be roughly $\log_2 N$.

Returning now to FIG. 3, at block 306 the rule mining manager 30 provides the list of components and the list of candidate rules to the rule filter 24, and the rule filter 24 produces—for each component—a filtered list of candidate rules associated with that component. As discussed above in detail, for each received component, the rule filter 24 iterates over the list of candidate rules and filters out all rules that are not contained within the received component. As a result of the execution of block 306, the rule filter 24 produces, and the rule mining manager 30 obtains, a filtered rules list having a plurality of elements (an element for each one of the components), where each element in the filtered rules list consists of a filtered list of candidate rules associated with a respective one of the components.

At block 308, an optimization step is performed whereby the rule mining manager 30 provides the filtered rules list (i.e., provides each component and the filtered list of candidate rules associated with the component) to the quantum optimization engine 26 which produces—for each component—an optimized set of rules (i.e., a set of optimized rules) associated with that component. As a result of the execution of block 308, the quantum optimization engine 26 produces, and the rule mining manager 30 obtains, an optimized rules list having a plurality of elements (an element for each one of the components), where each element in the optimized rules list consists of an optimized set of rules associated with a respective one of the components.

At block 310, an augmentation step is performed whereby the rule mining manager 30 provides the optimized rules list (i.e., provides each component and the set of optimized rules associated with that component), together with the existing policy and for each component a set of resources associated with that component, to the rule augmenter 28 which produces—for each component—an additional set of rules associated with that component. As a result of the execution of block 310, the rule augmenter 28 produces, and the rule mining manager 30 obtains, an additional rules list having a plurality of elements (an element for each one of the components), where each element in the additional rules list consists of an additional set of rules associated with a respective one of the components.

At block 312, the rule mining manager 30 performs an update step to produce an updated rules list by taking the union (for each component) of the optimized set of rules associated with the component (produced at block 308) and the additional set of rules associated with the component (produced at block 310). For each component, the set formed by taking the union of the two aforementioned sets of rules is referred to as a union set for that component. As discussed above, the updated rules list is a list of elements (an element for each one of the components), where each element in the list is associated with a respective one of the components and consists of the union set (i.e., the union of the optimized set of rules and the additional set of rules) associated with the respective one of the components.

At block 314, the rule mining manager 30 performs a consolidation (combining/merging) step to produce a new filtered rules list by consolidating elements of the updated rules list (produced at block 312). In particular, the rule mining manager 30 incrementally pares down the number of elements in the updated rules list by producing a new filtered rules list where each element in the new filtered rules list is associated with a respective consolidated component and consists of a consolidated list of rules associated with the respective consolidated component. As discussed above, each of the consolidated components is formed by taking the union of the two or more (non-disjoint) components associated with the updated rules list, and each consolidated list of rules is formed by taking the union of the two or more updated set of rules that are respectively associated with the two or more (non-disjoint) components used to form the associated consolidated component. Furthermore, as discussed above, preferably the set of components used to form one consolidated component is disjoint from the sets of components used to form all of the other consolidated components.

At block 316, the rule mining manager 30 checks the number of components associated with the new filtered rules list. If the new filtered rules list has associated therewith only one component (i.e., if there is not more than one component associated with the updated rules list), the process 300 moves from block 316 to block 318, at which point the process 300 outputs the set of rules associated with the singular component associated with the new filtered rules list. This output set of rules is the list of rules, i.e., the rule set, that could be used by the enterprise/organization to provide access control for controlling access to organizational resources.

If, however, at block 316 there is more than one component associated with the new filtered rules list, the process 300 returns to block 308 and repeats, as necessary, blocks 308-314. When block 308 is executed during a repetition (iteration) of the process 300, the quantum optimization engine 26 uses the new filtered rules list as input in order to produce a new optimized rules list. Similarly, when block 310 is executed during that repetition, the rule augmenter 28 uses the new optimized rules list as input to produce a new additional rules list.

In order to more clearly illustrate the process and sub-processes of FIG. 3 described above, FIG. 4 illustrates examples of some of the various rules lists that can be produced at certain steps of the process 300. It is stressed that these are merely examples provided in order to better illustrate the methods according to the embodiments of the present disclosure, and should not be considered in any way limiting to the particular number of components or number of rules or set of rules provided in the examples. Bearing this in mind, in the examples illustrated in FIG. 4, it is assumed for simplicity that the component generator 22 generated five components (labeled as "Component 1", "Component 2", "Component 3", "Component 4", "Component 5"). It is also noted that double arrow notation is used in FIG. 4 to indicate association between a set of rules and a component (and vice versa).

Figure 4:
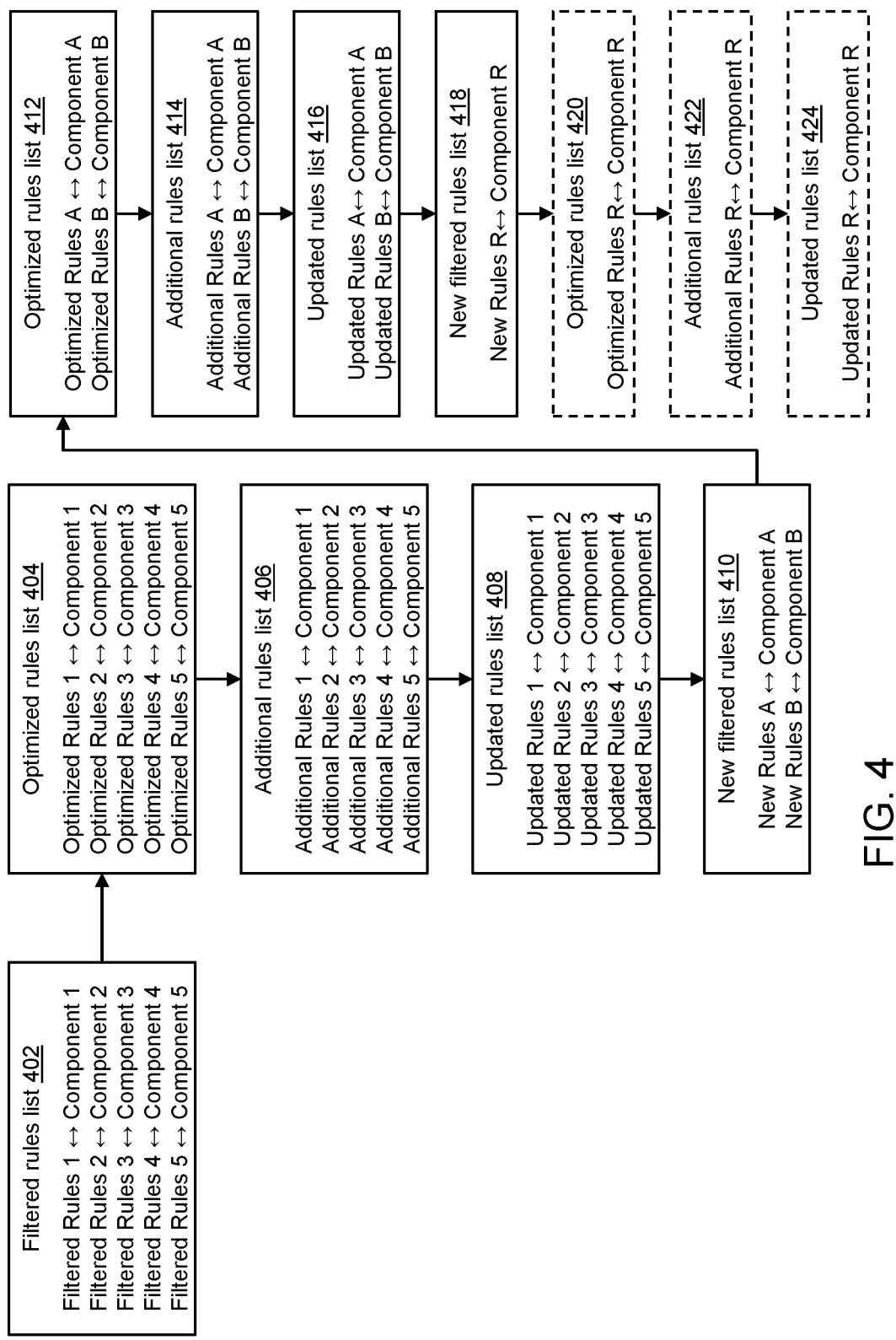
FIG. 4 is a diagram illustrating examples of lists of rules and rule sets that can be produced at various stages of the process of FIG. 3.

In the example illustrated in FIG. 4, the execution of block 306 results in the rule filter 24 producing a filtered rules list 402 that consists of five filtered lists of candidate rules (labeled as "Filtered Rules 1", "Filtered Rules 2", "Filtered Rules 3", "Filtered Rules 4", "Filtered Rules 5"), where each filtered list of candidate rules is associated with a respective one of five components (labeled as "Component 1", "Component 2", "Component 3", "Component 4", "Component 5").

The execution of block 308 results in the quantum optimization engine 26 producing an optimized rules list 404 that consists of five optimized sets of rules (labeled as "Optimized Rules 1", "Optimized Rules 2", "Optimized Rules 3", "Optimized Rules 4", "Optimized Rules 5"), where each optimized set of rules is associated with a respective one of the five components.

The execution of block 310 results in the rule augmenter 28 producing an additional rules list 406 that consists of five additional sets of rules (labeled as "Additional Rules 1", "Additional Rules 2", "Additional Rules 3", "Additional Rules 4", "Additional Rules 5"), where each additional rule set is associated with a respective one of the five components.

The execution of block 312 results in the rule mining manager 30 producing an updated rules list 408 that consists of five updated sets of rules (labeled as "Updated Rules 1", "Updated Rules 2", "Updated Rules 3", "Updated Rules 4", "Updated Rules 5"), where each updated set of rules is associated with a respective one of the five components. Here, the updated set of rules "Updated Rules 1" is the union of the optimized set of rules "Optimized Rules 1" and the additional set of rules "Additional Rules 1", and the updated set of rules "Updated Rules 2" is the union of the optimized set of rules "Optimized Rules 2" and the additional set of rules "Additional Rules 2", and so on.

The execution of block 314 results in the rule mining manager 30 combining elements of the updated rules list 408 to produce a new filtered rules list 410. In this example, the rule mining manager 30 consolidates Component 1 and Component 2 into a consolidated component labeled "Component A", and consolidates Component 3, Component 4, and Component 5 into a new component labeled "Component B". Thus, the rule mining manager 30 consolidates Updated Rules 1 and Updated Rules 2 (the updated rules associated with Component 1 and Component 2, respectively) into consolidated rules labeled "New Rules A", and consolidates Updated Rules 3, Updated Rules 4, and Updated Rules 5 (the updated rules associated with Component 3, Component 4, and Component 5, respectively) into new rules labeled "New Rules B".

Parenthetically, although in preferred embodiments each of the components associated with the new filtered rules list is a consolidated component formed from the union of two or more components associated with the updated rules list, in other embodiments, not all of the components must necessarily be consolidated components. For example, although in the example described with reference to FIG. 4 the consolidation step of block 314 consolidates components (and their respectively associated sets of rules) into two subsets of components and sets of rules in a single iterative step, the consolidation may be performed over separate iterations of the process 300. For example, in one iteration of the process the rule mining manager 30 may consolidate Component 1 and Component 2 into consolidated Component A, and consolidate Updated Rules 1 and Updated Rules 2 into consolidated New Rules A, and then execute blocks 308-312. Then, in a next iteration of the process 300 at block 314, the rule mining manger 30 may consolidate Component 3, Component 4, and Component 5 into consolidated Component B, and consolidate Updated Rules 3, Updated Rules 4, and Updated Rules 5 into consolidated New Rules B, and then execute blocks 308-312.

Returning now to the present example, as should be apparent, the new filtered rules list 410 consists of more than one set of consolidated rules and thus the number of components associated with the new filtered rules list 410 is greater than one. Therefore, as a result of execution of block 316 the process 300 returns to block 308 where the new filtered rules list 410 is provided as input to the quantum optimization engine 26, which responsively produces a new optimized rules list 412 that consists of two optimized sets of rules (labeled as "Optimized Rules A", "Optimized Rules B"), where each optimized set of rules is associated with a respective one of the now two components (Component A and Component B).

The process 300 then moves to block 310 where the new optimized rules list 412 is provided as input to the rule augmenter 28 together with the existing policy and the set of resources associated with Component A and the set of resources associated with Component B. In response, the rule augmenter 28 produces additional rules list 414 that consists of Additional Rules A associated with Component A, and Additional Rules B associated with Component B. In particular, for Component A, the rule augmenter 28 produces Additional Rules A (based on the Optimized Rules A, the existing policy, and the set of resources associated with Component A). For Component B, the rule augmenter 28 produces Additional Rules B (based on the Optimized Rules B, the existing policy, and the set of resources associated with Component B).

The process 300 then moves to block 312 where the rule mining manager 30 produces an updated rules list 416 from the additional rules list 414. The updated rules list 416 consists of two updated sets of rules (labeled as "Updated Rules A", "Updated Rules A"), where each updated set of rules is associated with a respective one of the two components (Component A and Component B). Here, the updated set of rules "Updated Rules A" is the union of the optimized set of rules "Optimized Rules A" and the additional set of rules "Additional Rules B", and the updated set of rules "Updated Rules B" is the union of the optimized set of rules "Optimized Rules B" and the additional set of rules "Additional Rules B".

The execution of block 314 results in the rule mining manager 30 consolidating elements of the updated rules list 416 to produce a new filtered rules list 418. In this example, the rule mining manager 30 consolidates Component A and Component B into a consolidated component labeled "Component R". Thus, the rule mining manager 30 consolidates Updated Rules A and Updated Rules B (the updated rules associated with Component A and Component A, respectively) into consolidated rules labeled "New Rules R".

As should be apparent, the new filtered rules list 418 consists of a single set of rules (New Rules R), which is associated with a single component (i.e., Component R). Thus, the process 300 moves to block 318 and outputs the consolidated rules "New Rules R" as the set of rules that can be used by an organization or enterprise to control access to organizational resources.

It is noted that in certain embodiments, the process 300 may execute a final partial iteration to optimize and optionally augment the consolidated rules to output a broader set of rules. For example, the process 300 may return to block 308, where in the example illustrated in FIG. 4, the new filtered rules list 418 is provided as input to the quantum optimization engine 26, which responsively produces optimized rules list 420 that consists of a single optimized set of rules, labeled as "Optimized Rules R", associated with Component R. The rule mining manager 30 may then output the optimized set of rules "Optimized Rules R" as the set of rules that can be used by an organization or enterprise to control access to organizational resources. Alternatively, the process 300 may move to block 310 where the optimized rules list 420 is provided as input to the rule augmenter 28 together with the existing policy and the set of resources associated with Component R. In response, the rule augmenter 28 produces additional rules list 422 that consists of Additional Rules R (which is generated based on the Optimized Rules R, the existing policy, and the set of resources associated with Component R) associated with Component R. The process 300 may then move to block 312 where the rule mining manager 30 produces an updated rules list 424 from the additional rules list 422. The updated rules list 424 consists of an updated set of rules, labeled as "Updated Rules R", associated with Component R. Here, the updated set of rules (Updated Rules R) is the union of the optimized set of rules "Optimized Rules R" and the additional set of rules "Additional Rules R". The rule mining manager 30 may then output the updated set of rules "Updated Rules R" as the set of rules that can be used by an organization or enterprise to control access to organizational resources.

Throughout the above description, reference has been made to various rules lists and rules sets, for example filtered rules lists, optimized rules lists, additional rules lists, updated rules lists, consolidated rules, optimized sets of rules, additional sets of rules, updated sets of rules, and the like. As alluded to above, these lists and sets are data objects that contain data and information which can be read from and written to computerized memory/storage, and can be operated on by computerized processors or similar such devices or apparatus to modify such data objects or create other data objects. To this end, the functions performed in association with the process illustrated in FIG. 3 are functions that are performed on data objects, by one or more computerized components that can be executed by computerized processors.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable (storage) medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computerized method comprising:
   obtaining a filtered rules list that includes a plurality of filtered lists of candidate rules, each filtered list of candidate rules associated with a respective component that includes a plurality of subsets of subjects associated with an organization and a plurality of subsets of resources associated with the organization, and each filtered list of candidate rules defining an action on at least one of the resources in the plurality of subsets of resources of the component to be taken by at least one of the subjects in the plurality of subsets of subjects of the component;
   optimizing, by a quantum optimization engine, the filtered rules list to produce an optimized rules list that includes, for each component of the plurality of components, an optimized set of rules associated with the component;
   augmenting the optimized rules list to produce an additional rules list that includes, for each component of the plurality of components, an additional set of rules associated with the component, and creating an updated rules list that includes, for each component of the plurality of components, an updated set of rules that includes the optimized set of rules associated with the component and the additional rule associated with the component;
   consolidating the updated rules list to produce a new filtered rules list that includes a plurality of consolidated filtered lists of rules, each consolidated filtered list of rules associated with a consolidated component produced by taking the union of two or more of the components associated with the updated rules list, and each consolidated filtered list of rules produced by taking the union of the updated set of rules associated with the two or components that form the associated consolidated component; and
   repeating the optimizing, augmenting, and consolidating until only a single set of rules associated with a single component remains.

2. The method of claim 1, further comprising: generating the plurality of components and generating a plurality of candidate rules based on information descriptive of the subjects and information descriptive of the resources stored in one or more directories.

3. The method of claim 2, further comprising: generating the filtered rules list based on the plurality of components and the plurality of candidate rules.

4. The method of claim 2, wherein generating the plurality of candidate rules includes applying the cartesian product to sets of subjects and sets of resources.

5. The method of claim 2, wherein the plurality of components is generated such that any pair of components from the plurality of components are non-disjoint.

6. The method of claim 2, wherein the plurality of components is generated such that: i) no two components in the plurality of components is the same, ii) for each subject in the organization there is at least one component in the plurality of components in which the subject is represented, iii) for each resource in the organization there is at least one component in the plurality of components in which the resource is represented, iv) a subset of subjects in one of the components of the plurality of components is present in at least one other component of the plurality of components, and v) a subset of resources in one of the components of the plurality of components is present in at least one other component of the plurality of components.

7. The method of claim 1, further comprising: outputting the single set of rules as a set of rules that can be used by the organization to control access to the resources associated with the organization.

8. The method of claim 1, wherein the resources are electronic resources and each of the resources is of a resource type selected from the group consisting of: a computer, a server, a database, and an electronic access point.

9. The method of claim 1, wherein each of the subjects is of a subject type selected from the group consisting of: a user, a computer, and a server.

10. The method of claim 1, wherein the quantum optimization engine is configured as at least one of: i) a quantum optimizer that includes quantum computing circuitry for performing quantum optimization algorithms, or ii) a quantum inspired optimizer that includes non-quantum computing circuitry for performing quantum inspired optimization algorithms.

11. The method of claim 1, wherein the filtered lists of candidate rules are produced from a plurality of candidate rules, and wherein the candidate rules are in accordance with a role-based access control (RBAC) policy.

12. The method of claim 1, wherein the filtered lists of candidate rules are produced from a plurality of candidate rules, and wherein the candidate rules are in accordance with an attribute-based access control (ABAC) policy.

13. A computer system comprising:
a non-transitory computer readable storage medium for storing computer components; and
a processor for executing the computer components comprising:
a rule mining manager configured to:
obtain a filtered rules list that includes a plurality of filtered lists of candidate rules, each filtered list of candidate rules associated with a respective component that includes a plurality of subsets of subjects associated with an organization and a plurality of subsets of resources associated with the organization, and each filtered list of candidate rules defining an action on at least one of the resources in the plurality of subsets of resources of the component to be taken by at least one of the subjects in the plurality of subsets of subjects of the component,
instruct a quantum optimization engine to perform an optimization step by providing the filtered rules list to the optimization engine to produce an optimized rules list that includes, for each component of the plurality of components, an optimized set of rules associated with the component,
instruct a rule augmenter to perform an augmentation step to produce, based in part on the optimized rules list, an additional rules list that includes, for each component of the plurality of components, an additional set of rules associated with the component,
perform an update step by creating an updated rules list that includes, for each component of the plurality of components, an updated set of rules that includes the optimized set of rules associated with the component and the additional rule associated with the component,
perform a consolidation step by consolidating the updated rules list to produce a new filtered rules list that includes a plurality of consolidated filtered lists of rules, each consolidated filtered list of rules associated with a consolidated component produced by taking the union of two or more of the components associated with the updated rules list, and each consolidated filtered list of rules produced by taking the union of the updated set of rules associated with the two or components that form the associated consolidated component, and
repeatedly: instruct the quantum optimization engine to perform the optimization step, the rule augmenter to perform the augmentation step, perform the update step, and perform the consolidation step until only a single set of rules associated with a single component remains.

14. The computer system of claim 13, wherein the computer components further comprise:
a rule generator configured to generate a plurality of candidate rules based on information descriptive of the subjects and information descriptive of the resources received from one or more directories communicatively coupled to the rule mining manager, and
a component generator configured to generate the plurality of components based on information descriptive of the subjects and information descriptive of the resources received from one or more directories communicatively coupled to the rule mining manager.

15. The computer system of claim 14, wherein the computer components further comprise:
a rule filter configured to receive the plurality of components and the plurality of candidate rules, and responsively produce the filtered list of candidate rules for each component.

16. The computer system of claim 14, wherein the rule generator is configured to generate the plurality of candidate rules by applying the cartesian product to sets of the subjects and sets of the resources.

17. The computer system of claim 14, wherein the component generator is configured to generate the plurality of components such that: i) no two components in the plurality of components is the same, ii) for each subject in the organization there is at least one component in the plurality of components in which the subject is represented, iii) for each resource in the organization there is at least one component in the plurality of components in which the resource is represented, iv) a subset of subjects in one of the components of the plurality of components is present in at least one other component of the plurality of components, and v) a subset of resources in one of the components of the plurality of components is present in at least one other component of the plurality of components.

18. The computer system of claim 13, wherein the quantum optimization engine is configured as at least one of: i)

a quantum optimizer that includes quantum computing circuitry for performing quantum optimization algorithms, or ii) a quantum inspired optimizer that includes non-quantum computing circuitry for performing quantum inspired optimization algorithms.

19. The computer system of claim 13, wherein the computer components further comprise:
   a rule generator configured to generate a plurality of candidate rules in accordance with a role-based access control (RBAC) policy.

20. The computer system of claim 13, wherein the computer components further comprise:
   a rule generator configured to generate a plurality of candidate rules in accordance with an attribute-based access control (ABAC) policy.

21. The computer system of claim 13, wherein the rule mining manager is further configured to output the single set of rules as a set of rules that can be used by the organization to control access to the resources associated with the organization.

22. A computer usable non-transitory storage medium having a computer program embodied thereon for causing a suitable programmed system to perform the following steps when such program is executed on the system, the steps comprising:
   obtaining a filtered rules list that includes a plurality of filtered lists of candidate rules, each filtered list of candidate rules associated with a respective component that includes a plurality of subsets of subjects associated with an organization and a plurality of subsets of resources associated with the organization, and each filtered list of candidate rules defining an action on at least one of the resources in the plurality of subsets of resources of the component to be taken by at least one of the subjects in the plurality of subsets of subjects of the component;
   optimizing, by a quantum optimization engine, the filtered rules list to produce an optimized rules list that includes, for each component of the plurality of components, an optimized set of rules associated with the component;
   augmenting the optimized rules list to produce an additional rules list that includes, for each component of the plurality of components, an additional set of rules associated with the component, and creating an updated rules list that includes, for each component of the plurality of components, an updated set of rules that includes the optimized set of rules associated with the component and the additional rule associated with the component;
   consolidating the updated rules list to produce a new filtered rules list that includes a plurality of consolidated filtered lists of rules, each consolidated filtered list of rules associated with a consolidated component produced by taking the union of two or more of the components associated with the updated rules list, and each consolidated filtered list of rules produced by taking the union of the updated set of rules associated with the two or components that form the associated consolidated component; and
   repeating the optimizing, augmenting, and consolidating until only a single set of rules associated with a single component remains.

* * * * *